Figure 1:
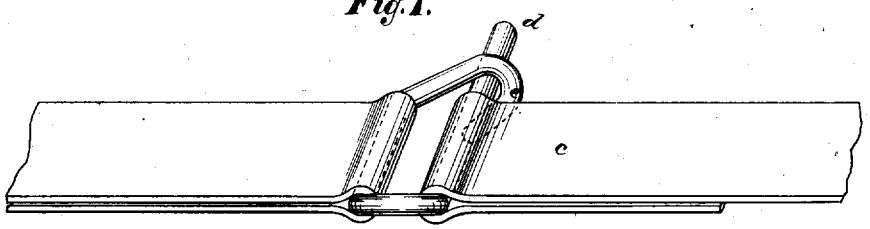
Figure 2:
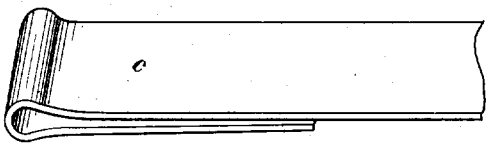
Figure 3:
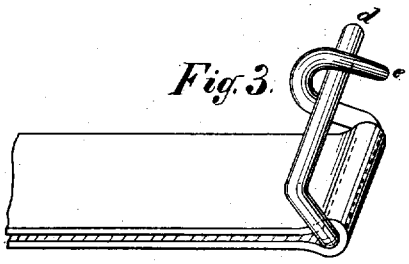

G. A. SEAVER,

Assignor, by mesne assignments, to R. W. RAYNE.

Cotton Bale-Tie.

No. 8,482. Reissued Nov. 12, 1878.

*Witnesses:*

Wm. A. Hutchinson

Benj. A. Smith

*Inventor:*

George A. Seaver by Robert H. Duncan, attorney.

UNITED STATES PATENT OFFICE.

GEORGE A. SEAVER, OF NEW YORK, N. Y., ASSIGNOR, BY MESNE ASSIGNMENTS, TO ROBERT W. RAYNE.

IMPROVEMENT IN COTTON-BALE TIES.

Specification forming part of Letters Patent No. 77,770, dated May 12, 1868; Reissue No. 8,482, dated November 12, 1878; application filed August 10, 1878.

*To all whom it may concern:*

Be it known that I, GEORGE A. SEAVER, of the city and county of New York, and State of New York, have invented an Improved Cotton-Bale Tie, for which, under that name and title, Letters Patent of the United States were granted unto me, bearing date the 12th day of May, 1868, numbered 77,770; and whereas said Letters Patent are believed to be inoperative by reason of an insufficient description and specification, I do hereby declare the following to be a full, clear, and exact description of my said invention, and of the manner in which it may be used, reference being had to the accompanying drawings, forming a part of this specification.

The object of my invention is to make a tie or fastening that shall have no sharp corners to injure the strap, and into which the tie may be inserted, either by bending into a loop and slipping in sidewise, as hereinafter explained, or by passing the strap or band endwise into the buckle and bending the end back and under, so that it may be held by or between the subsequently expanded bale and the lower face of the strap.

To accomplish these objects the said invention consists of a buckle formed of a single piece of stiff wire, bent into the form of a parallelogram, the end bar *e* being bent into a hook around the end *d*, space being left sufficient to admit the band *c*, when bent into a loop, to pass between the hook *e* and end *d*, as shown, and for this purpose the hook *e* may be bent at a curve of greater radius than the circumference of the wire, or the end *d* may be raised slightly out of the hook, and this feature is especially valuable for use on country bales. But it results from the strain of the expansion of the bale that the bar *d* is drawn down into the hook *e* and permanently closed, the hook supporting and sustaining said bar *d* and preventing it being straightened, which would otherwise result. It follows that the tie can then only be used by passing the end of the band into the buckle and bending it under, as above described; but I wish to disclaim the method of passing the band into the buckle either sidewise, as in the first instance, or endwise, as in the second, since these are old and well-known devices; but

I claim as new and desire to secure by Letters Patent—

A bale-tie link consisting of a single piece of stiff wire, bent into the form of a parallelogram, and so that the end *e*, where the two ends of the wire cross each other, is made to sustain and support the end *d*, substantially as shown and described, and for the purposes set forth.

In testimony whereof I have hereunto set my hand and seal this 28th day of May, A. D. 1878.

GEORGE A. SEAVER. [L. S.]

Witnesses:
J. B. NONES,
S. STEINHEIMER.